(12) United States Patent
Satran et al.

(10) Patent No.: US 7,010,614 B2
(45) Date of Patent: Mar. 7, 2006

(54) SYSTEM FOR COMPUTING CUMULATIVE AMOUNT OF DATA RECEIVED BY ALL RDMA TO DETERMINE WHEN A COMPLETE DATA TRANSFER HAS ARRIVED AT RECEIVING DEVICE

(75) Inventors: Julian Satran, Atlit (IL); Kalman Meth, Netanya (IL)

(73) Assignee: International Business Machines Corporation, Armonk, NY (US), .

( * ) Notice: Subject to any disclaimer, the term of this patent is extended or adjusted under 35 U.S.C. 154(b) by 827 days.

(21) Appl. No.: 09/897,414

(22) Filed: Jul. 3, 2001

(65) Prior Publication Data

US 2002/0029305 A1 Mar. 7, 2002

Related U.S. Application Data

(60) Provisional application No. 60/215,994, filed on Jul. 5, 2000.

(51) Int. Cl.
G06F 15/16 (2006.01)
(52) U.S. Cl. ...................................... 709/237; 709/212
(58) Field of Classification Search ................ 709/212, 709/203, 237; 711/114; 370/412; 710/22; 714/4; 719/316
See application file for complete search history.

(56) References Cited

U.S. PATENT DOCUMENTS

| | | | |
|---|---|---|---|
| 5,978,865 A | | 11/1999 | Hansen et al. |
| 6,134,607 A * | 10/2000 | Frink | 710/22 |
| 6,223,211 B1 * | 4/2001 | Hamilton et al. | 709/203 |
| 6,272,591 B1 * | 8/2001 | Grun | 711/114 |
| 6,675,200 B1 * | 1/2004 | Cheriton et al. | 709/212 |
| 6,697,878 B1 * | 2/2004 | Imai | 719/316 |
| 6,715,099 B1 * | 3/2004 | Smith | 714/4 |
| 6,801,535 B1 * | 10/2004 | Richards et al. | 370/412 |

OTHER PUBLICATIONS

C. Sapuntzakis, "The Case for RDMA" Draft paper, http://www.cs.duke.edu/arl/publications/draft-csapuntz-caserdma-00.txt.
Abstract of JP2000/020490.

* cited by examiner

Primary Examiner—Le Hien Luu
(74) Attorney, Agent, or Firm—Browdy and Neimark, PLLC

(57) ABSTRACT

A method and system for transmitting data along one or more communication channels to a receiving device having addressable memory units, the data having a known size and being split into two or more data packets each having a respective header and each sent along one of said communication channels to a respective memory unit. A respective final data packet to be sent along each communication channel is marked so as to be identifiable by a respective memory unit. For each memory unit receiving the respective final data packet, an interrupt is generated, the receiving device is informed how much data was received by the memory unit, and a cumulative amount of data received by all memory units is determined so as to allow the reading device to identify when no more data packets are to be transmitted.

19 Claims, 3 Drawing Sheets

SYSTEM FOR COMPUTING CUMULATIVE AMOUNT OF DATA RECEIVED BY ALL RDMA TO DETERMINE WHEN A COMPLETE DATA TRANSFER HAS ARRIVED AT RECEIVING DEVICE

FIELD OF THE INVENTION

This invention relates to Remote Direct Memory Access.

BACKGROUND OF THE INVENTION

Remote Direct Memory Access (RDMA) is a feature that is provided on some communications infrastructures and allows data to be written to, and read from, specific locations in memory without the need for data to be received at a central buffer and copied to the destination addresses under CPU control. The sender of data specifies, in a form understood by the receiver, where the data should be placed at the receiving end. The data might then be placed on the receiving end without having to examine a complex context. The receiver might even delegate the data placement to specialized hardware. When data has been successfully delivered into the receiver's buffers, the receiver must be notified of the completed transfer (usually by some kind of interrupt mechanism).

RDMA may find application for data transfer between storage devices and servers in an IP network. In such case, RDMA allows a network device to read or write remote memory. Control information associated with the data specifies the buffers to be read or written. The remote network card extracts the identity of the buffer and uses DMA to read/write memory directly.

JP020490A2 assigned to FUJITSU LTD., published Jan. 21, 2000 and entitled "Computer having remote procedure calling mechanism or object request broker mechanism, data transfer method and transfer method storage medium" relates to the desirability of shortening the delay of data transfer between computers having object request broker and remote procedure calling mechanisms by directly transferring data from a physical memory area built in a communication source computer to a physical memory area in a communication party side computer. To this end, a remote direct data transfer unit executes remote direct memory access (RDMA) for directly transferring data stored in a physical memory built in its own computer to a physical memory area in a communication party side computer. A system area network connects the computers and is used as a physical communication line to effect data transfer by the remote direct data transfer unit.

U.S. Pat. No. 5,978,865 published Nov. 2, 1999 and assigned to Advanced Micro Devices, Inc. discloses a system for performing DMA transfers where an interrupt request signal is generated based on the value of the last of a plurality of data bits transmitted. A micro-controller is configurable to transfer data to and from one or more asynchronous serial ports (ASPs) using direct memory access (DMA), and having hardware features which cause each ASP to notify the execution unit when a data frame having a last data bit equal to a predetermined value is received. Such hardware features allow the execution unit to determine when complete data packets are received. The serial communication data is transmitted within data frames, wherein each data frame includes multiple data bits transmitted sequentially between a start bit and one or more stop bits. The last data bit of the multiple data bits is transmitted immediately before the one or more stop bits. Each ASP is configurable to generate an ASP interrupt request signal when the value of the last of the multiple data bits is equal to a predetermined value.

U.S. Pat. No. 5,978,865 does not appear to address the division of a data transfer over multiple channels. They describe the workings of a DMA engine, passing data from a communication link to memory. When each individual transfer of a data packet is completed, they generate an interrupt. They do not address a data transfer that has been spread across several channels or that has been divided into multiple data packets, where an interrupt is required only after all of the data packets for a particular data transfer have arrived.

Reference is also made to a working draft by Cisco accessible on http://www.cs.duke.edu/ari/publications/draft-csapuntz-caserdma-00.txt. Particular reference is made to Section 6 entitled "Implementing RDMA". It is to be noted that this paper, while relevant to the general field of the invention, proposes several solutions to the problem of framing but does not address the problem to whose solution the invention is directed. A complete copy of this paper is being deposited at the Patent Office so as to allow access thereto in the event that Internet access is disabled.

Regardless of the specific application for which RDMA is used, a known problem of RDMA relates to determining when a data transfer has been completed. This is particularly acute when a large data transfer ("transaction") is broken down into several smaller data transfers ("packets"). The receiver must be informed that the entire transaction has been completed. An RDMA engine may know how much data has been transferred on each packet, and it may also know how much data makes up the entire transaction. The RDMA engine would then have to keep track of how much data has arrived for each pending transaction constituting the complete data transfer, and would generate an interrupt when it has received the total number of bytes that were specified for a particular transaction (after receiving some number of packets).

The problem is compounded when the individual packets constituting the transaction are sent to the RDMA engine via different network fabrics. In this case, no single RDMA engine on the receiving end receives all of the data for a particular transaction, and therefore no single RDMA engine can know when the transaction has completed. It is therefore known to generate an interrupt or callback for each packet on each of the RDMA engines, and compute the total data delivered for the transaction in software. This solution has the undesirable condition that it results in an interrupt being generated for each packet. The receiver is interested in knowing when the entire transaction (comprising all the data packets) has completed, and all the extra interrupts/callbacks for the small data transfers consume resources that could otherwise be used for other purposes.

The same problem obtains when transmitting data having a main header following by multiple data packets, each having its own sub header containing less comprehensive addressing information. The main header contains most of the addresses for directing each subsequent data packet to a specified buffer memory, as well as the combined length of the data in all of the subsequent data packets. Consequently, without the main header, it is not possible to place the subsequent data packet, and it is not easy to determine when the data transfer has completed. There is therefore a serious problem if the main header is lost or arrives garbled.

One proposed solution requires identification of the first packet in the next string so as to identify the arrival of the next main header. If, at this stage, it is not possible to deliver the preceding data packets owing to loss of the previous main header, then the preceding data packets can either be discarded or buffered pending possible recovery of the preceding header.

The requirement to identify the start of the next packet also has several drawbacks. First, if there is no subsequent packet, then it is neither clear whether the received data is complete nor what to do with the data so far received. Secondly, such an approach is suitable only if all the data packets are sent on a single channel since if they are divided among different channels, and some of these channels have finished sending data while data continues to be sent along one or more remaining channels, then so far as those channels are concerned where the data transmission is now complete there is no indication that no more data will be sent. This is similar to the first problem but even more acute since the main header is sent once only on only one channel and so inevitably arrives disassociated from all those data packets sent on different channels.

It would therefore be desirable to provide a solution to this problem that minimizes the number of interrupts in determining when a transaction using RDMA has completed.

SUMMARY OF THE INVENTION

It is therefore an object of the invention to provide an improved method for transmitting data along one or more communication channels to a receiving device having addressable memory units, particularly in the context of RDMA.

To this end there is provided in accordance with one aspect of the invention a method for transmitting data along one or more communication channels to a receiving device having addressable memory units, the data having a known size and being split into two or more data packets each having a respective header and each sent along one of said communication channels to a respective memory unit, the method comprising:

(a) marking a respective final data packet to be sent along each communication channel so as to be identifiable by a respective memory unit, (b) for each memory unit receiving said respective final data packet generating an interrupt and informing the receiving device how much data was received by said memory unit, and (c) determining a cumulative amount of data received by all memory units so as to allow the reading device to identify when no more data packets are to be transmitted.

According to a second aspect of the invention, there is provided a reading device including a controller coupled to a plurality of RDMA engines each adapted to receive data packets associated with a transaction on a respective communication channel and each being responsive to receiving on the respective communication channel a final packet associated with the transaction for:

(a) generating an interrupt, and (b) reporting to the controller an amount of data received on the respective communication channel.

According to a third aspect of the invention, there is provided a client-server system comprising:

a server, a client machine remotely coupled to the server by at least two communication channels for receiving from the server data packets associated with a transaction that are transmitted to a reading device in the client machine, said reading device comprising:

a controller coupled to a plurality of RDMA engines each adapted to receive data packets on a respective communication channel and each being responsive to receiving on the respective communication channel a final packet associated with the transaction for:

(a) generating an interrupt, and (b) reporting to the controller an amount of data received on the respective communication channel.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A SPECIFIC EMBODIMENT

Figure 1:
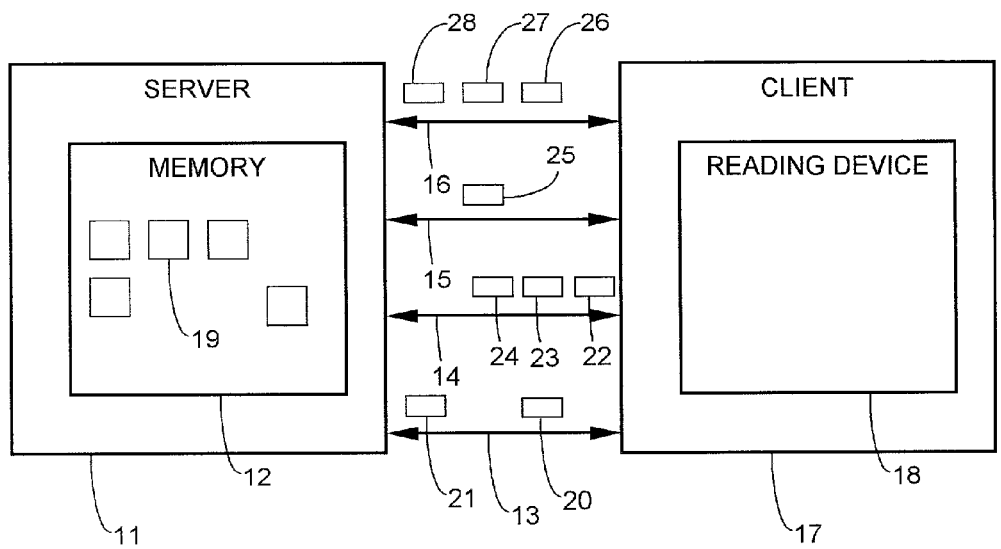
FIG. 1 is a block diagram showing schematically a system for sending data from a server to a client machine via multiple network paths.

FIG. 1 shows schematically a client/server system 10 comprising a server 11 having a memory 12 and connected via a plurality of communication channels 13, 14, 15 and 16 to a client 17 having a reading device 18. Stored in the memory 12 of the server 11 is a plurality of data packets designated uniformly as 19 that are to be sent via selected ones of the communication channels to the reading device 18 in the client 17. Thus, two data packets designated 20 and 21 are sent via the communication channel 13; three data packets designated 22, 23 and 24 are sent via the communication channel 14; one data packet 25 is sent via the communication channel 15; and three data packets designated 26, 27 and 28 are sent via the communication channel 16. The nine data packets 20 to 28 together constitute data having a known size that is split into a number of data packets, which are sent along different designated communication channels to the reading device 18. The address of the receiver is typically specified in a header so that the data packet can be routed to the proper location. The packet header may also contain information indicating in which memory unit to place the data, unless it is implicitly understood by some context, such as the order in which the packets arrive.

Figure 2:
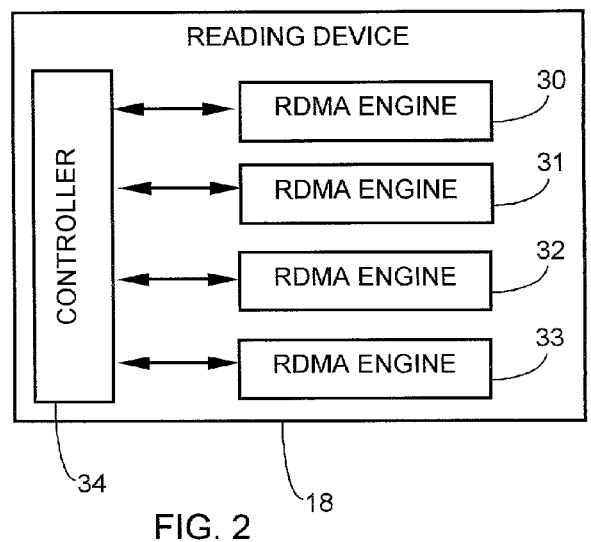
FIG. 2 is a block diagram showing schematically an RDMA reading device used in the client machine of FIG. 1.

As shown in FIG. 2, the reading device 18 comprises a plurality of RDMA engines designated 30, 31, 32 and 33 commonly coupled to a controller 34 and each being connected to one of the communication channels 13 to 16. In FIG. 1 data packets are shown transmitted on each of the communication channels 13 to 16 and therefore each of the RDMA engines 30 to 33 will receive data. However, in practice, data need not be sent along some of the communication channels and in such case the corresponding RDMA engines will take no part in the transaction. The invention provides a mechanism for avoiding the unnecessary overhead of RDMA interrupts in such cases.

Figure 3:
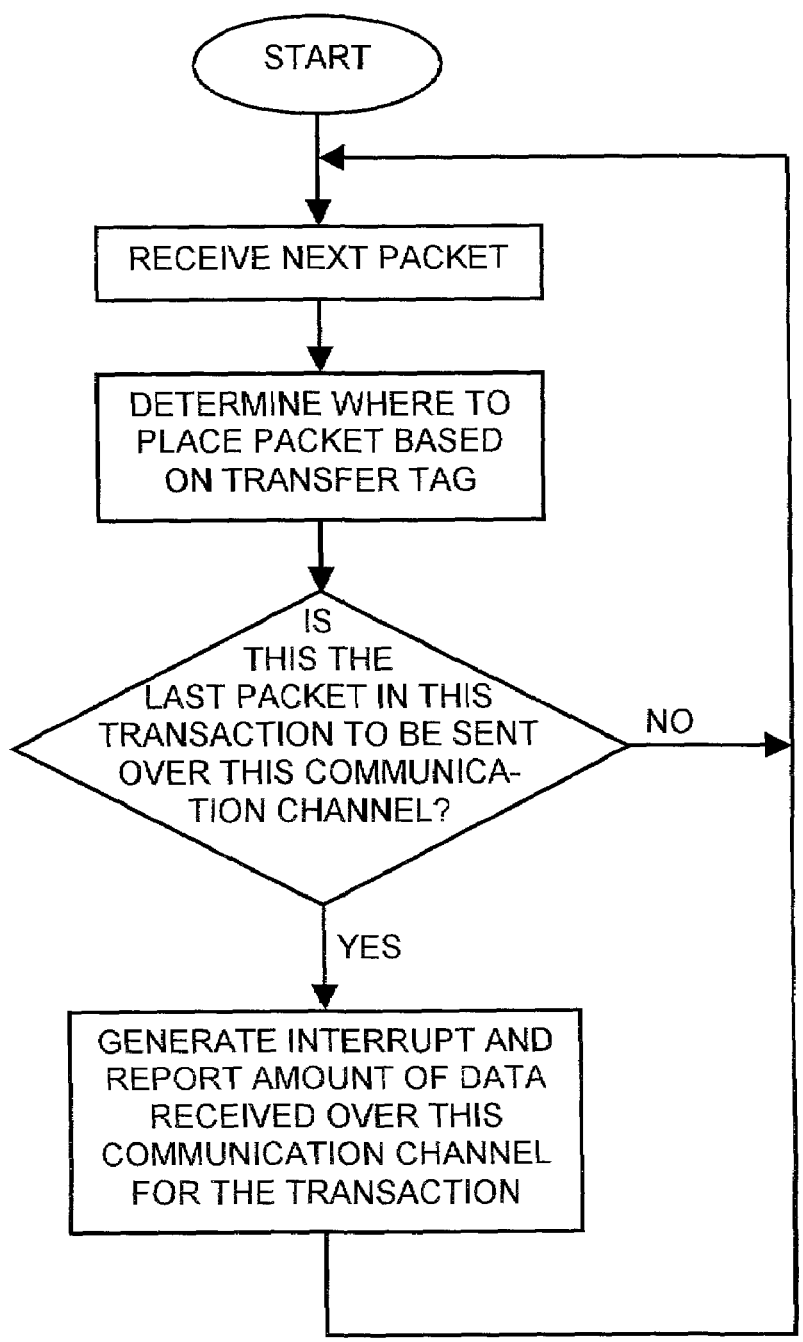
FIG. 3 is a flow diagram showing the principal operating steps carried out by an RDMA engine in the reading device.
Figure 4:
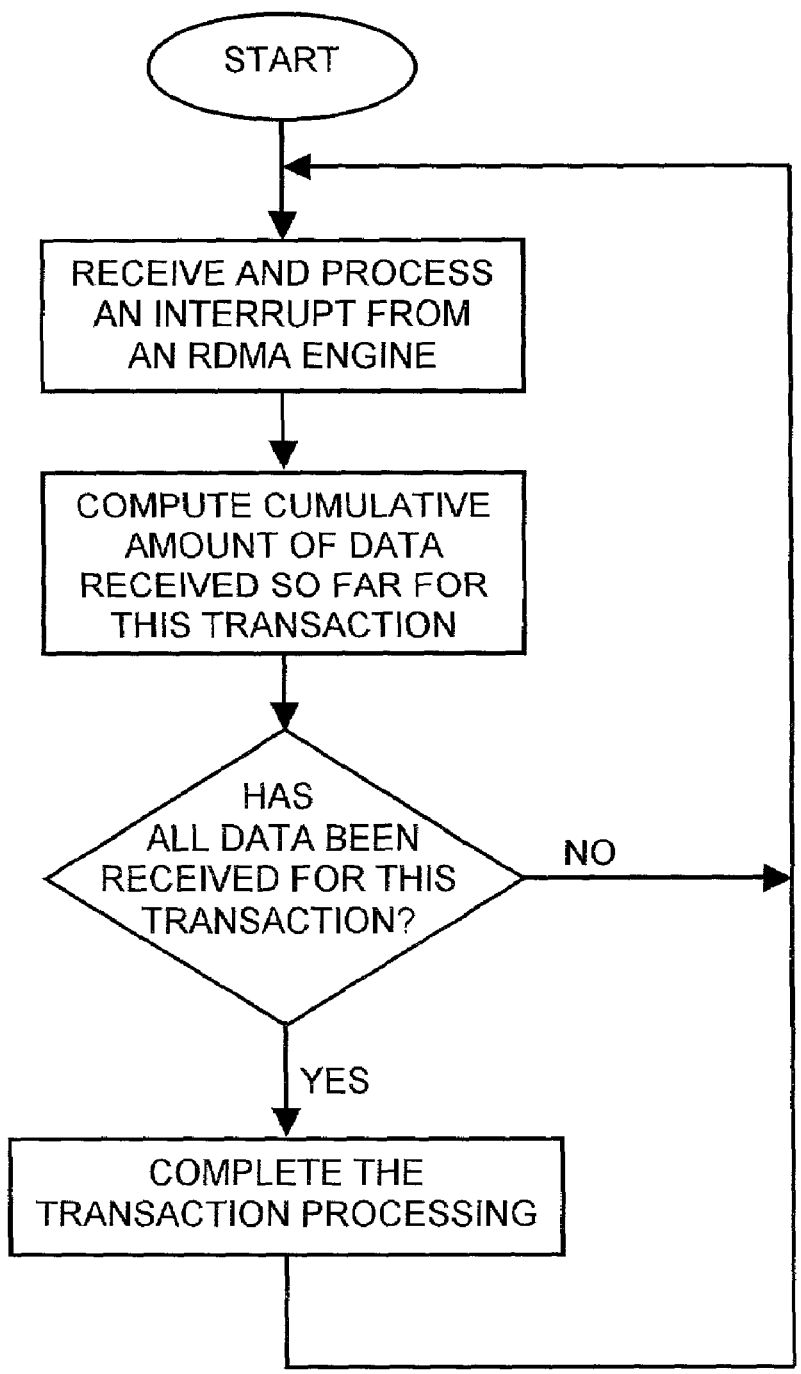
FIG. 4 is a flow diagram showing the principal operating steps carried out by a controller in the reading device.

FIGS. 3 and 4 show the principal operating steps carried out by the RDMA engines 30 to 33 and the controller 34 respectively to avoid such overhead. The server 11 sends the data packets 20 to 28 over several communication channels 13 to 16. When the server 11 has sent the last data packet through a particular communication channel, the server 11 marks the end-of-data using a marker rather than can be a flag in the message header that indicates that this is the last data packet being sent on this communication channel for this transaction. Alternatively, the marker can be a specially formatted message such as an empty RDMA packet. For example, the second data packet 21 transmitted on the first communication channel 13 and the third data packet 24 transmitted on the second communication channel 14 would both be marked as the last data packet in the transaction to be sent over the respective communication channel.

If the server finished sending out data for a transaction, but it had sent data earlier over a communication channel without marking the last packet sent on that channel, the server 11 must send a specially formatted message such as an empty RDMA packet that marks it as the last packet being sent over this communication channel for this transaction. Each RDMA engine in the reading device 18 thus knows which packet is the last packet it will receive for a particular transaction. Upon receiving this last packet, the RDMA engine generates an interrupt/callback, informing the controller 34 how much data it has received on its communication channel for this transaction. The controller 34 computes the cumulative amount of data received so far and when all the data has been received via the active RDMA engines, the controller 34 knows that the transaction has completed.

Any RDMA engine in the reading device 18 that receives no data during this transaction does not generate an interrupt. On the other hand, any RDMA engine that did process data packets for the current transaction generates a single interrupt only for the transaction when the last data packet thereof is received on its respective communication channel. Since no interrupts are generated by non-participating RDMA engines, the number of interrupts is reduced compared with hitherto proposed schemes.

According to a variant of this technique, the server may inform the reading device of the communication channels on which it has sent data packets, enabling the reading device to cross-check the validity of the receive-counts. In this context, it will be understood that the receiver must be informed that all of the data on a particular channel has arrived. According to the invention, it is required that only a single interrupt be generated when all of the data has arrived. Since the receiver knows how much data to expect on a particular channel, the receiver must pass that information to the RDMA engine, so that the RDMA engine will know to generate an interrupt when the specified amount of data has arrived. In this variant, instead of marking the end of a data transfer within the data transfer stream, the end of the data transfer is known ahead of time by informing the receiver how much data to expect on the specified channel.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

In the method claims that follow, alphabetic characters used to designate claim steps are provided for convenience only and do not imply any particular order of performing the steps.

The invention claimed is:

1. A method for transmitting packets of data of a transaction along one or more communication channels to a receiving device having multiple memory units so as to allow the receiving device to determine when a complete data transfer has arrived for said transaction, said packets having a known cumulative size and each having a respective header and each being sent along one of said communication channels to a respective memory unit, the method comprising:
   (a) marking a respective final data packet to be sent along each communication channel so as to be identifiable by a respective memory unit,
   (b) for each memory unit receiving said respective final data packet generating an interrupt such that a single interrupt is generated for each memory unit receiving data and informing the receiving device how much data was received by said memory unit, and
   (c) determining a cumulative amount of data received by all memory units so as to allow the reading device to identify when no more data packets are to be transmitted.

2. The method according to claim 1, further including:
   (d) sending to the reading device data identifying along which of said communication channels data packets were sent so as to allow the reading device to check that a correct amount of data is received on each of said communication channels.

3. The method according to claim 1, wherein marking a respective final data packet includes:
   embedding in the respective header of the final data packet data identifying it as the final packet to be sent along the respective communication channel.

4. The method according to claim 1, wherein marking a respective final data packet includes:
   transmitting a specially formatted message after the final data packet identifying it as the final packet to be sent along the respective communication channel.

5. The method according to claim 4, wherein the specially formatted message is an empty packet.

6. The method according to claim 1, wherein the memory unit is a component of an RDMA engine.

7. A reading device including a plurality of RDMA engines each adapted to receive data packets of a transaction on a respective communication channel and each being responsive to receiving on the respective communication channel a final packet associated with the transaction for:
   (a) generating an interrupt such that a single interrupt is generated is for each RDMA engine receiving data,
   (b) reporting to the reading device an amount of data received on the respective communication channel, and
   (c) computing a cumulative amount of data received by all RDMA engines that have generated respective interrupts.

8. The reading device according to claim 7, being responsive to all data having been received for completing processing associated with the transaction.

9. A client-server system comprising:
   a server,
   a client machine remotely coupled to the server by at least two communication channels for receiving from the server data packets of a transaction that are transmitted to a reading device in the client machine, said reading device comprising:
   a plurality of RDMA engines each adapted to receive data packets on a respective communication channel and each being responsive to receiving on the respective communication channel a final packet of the transaction for:
  (a) generating an interrupt such that a single interrupt is generated is for each RDMA engine receiving data,
  (b) reporting to the reading device an amount of data received on the respective communication channel, and
  (c) computing a cumulative amount of data received by all RDMA engines that have generated respective interrupts.

10. The client-server system according to claim 9, wherein the reading device is responsive to all data having been received for completing processing associated with the transaction.

11. A program storage device readable by machine, tangibly embodying a program of instructions executable by the machine to perform method steps for transmitting data along one or more communication channels to a receiving device having memory units so as to allow the receiving device to determine when a complete data transfer has arrived, the data having a known size and being split into two or more data packets each having a respective header and each sent along one of said communication channels to a respective memory unit, the method comprising:
  (a) marking a respective final data packet to be sent along each communication channel so as to be identifiable by a respective memory unit,
  (b) for each memory unit receiving said respective final data packet generating an interrupt such that a single interrupt is generated for each memory unit receiving data and informing the receiving device how much data was received by said memory unit, and
  (c) determining a cumulative amount of data received by all memory units so as to allow the reading device to identify when no more data packets are to be transmitted.

12. The program storage device according to claim 11, wherein the memory units are RDMA engines.

13. A computer program product comprising a computer useable medium having computer readable program code embodied therein for transmitting data along one or more communication channels to a receiving device having memory units so as to allow the receiving device to determine when a complete data transfer has arrived, the data having a known size and being split into two or more data packets each having a respective header and each sent along one of said communication channels to a respective memory unit, the computer program product comprising:
  computer readable program code for causing the computer to mark a respective final data packet to be sent along each communication channel so as to be identifiable by a respective memory unit,
  computer readable program code for each memory unit to generate an interrupt responsive to receipt of said respective final data packet such that a single interrupt is generated for each memory unit receiving data and to inform the receiving device how much data was received by said memory unit, and
  computer readable program code for causing the computer to determine a cumulative amount of data received by all memory units so as to allow the reading device to identify when no more data packets are to be transmitted.

14. The computer program product according to claim 13, wherein the memory units are RDMA engines.

15. A method for transmitting packets of data of a transaction along one or more communication channels to a receiving device having multiple RDMA engines so as to allow the receiving device to determine when a complete data transfer has arrived for said transaction, said packets having a known cumulative size and each having a respective header and each being sent along one of said communication channels to a respective RDMA engine, the method comprising:
  (a) marking a respective final data packet to be sent along each communication channel so as to be identifiable by a respective RDMA engine;
  (b) for each memory unit receiving said respective final data packet generating an interrupt such that a single interrupt is generated for each memory unit receiving data and informing the receiving device how much data was received by said RDMA engine; and
  (c) determining a cumulative amount of data received by all RDMA engines so as to allow the reading device to identify when no more data packets are to be transmitted.

16. The method according to claim 15, further including:
  (d) sending to the reading device data identifying along which of said communication channels data packets were sent so as to allow the reading device to check that a correct amount of data is received on each of said communication channels.

17. The method according to claim 15, wherein marking a respective final data packet includes:
  embedding in the respective header of the final data packet data identifying it as the final packet to be sent along the respective communication channel.

18. The method according to claim 15, wherein marking a respective final data packet includes:
  transmitting a specially formatted message after the final data packet identifying it as the final packet to be sent along the respective communication channel.

19. The method according to claim 18, wherein the specially formatted message is an empty packet.

* * * * *